July 13, 1965  H. L. WULFF  3,194,388
ENDLESS CONVEYOR WITH SUPPORT
Filed May 8, 1961  2 Sheets-Sheet 1

BY *Shanley & O'Neil*
ATTORNEYS.

July 13, 1965     H. L. WULFF     3,194,388
ENDLESS CONVEYOR WITH SUPPORT
Filed May 8, 1961     2 Sheets-Sheet 2
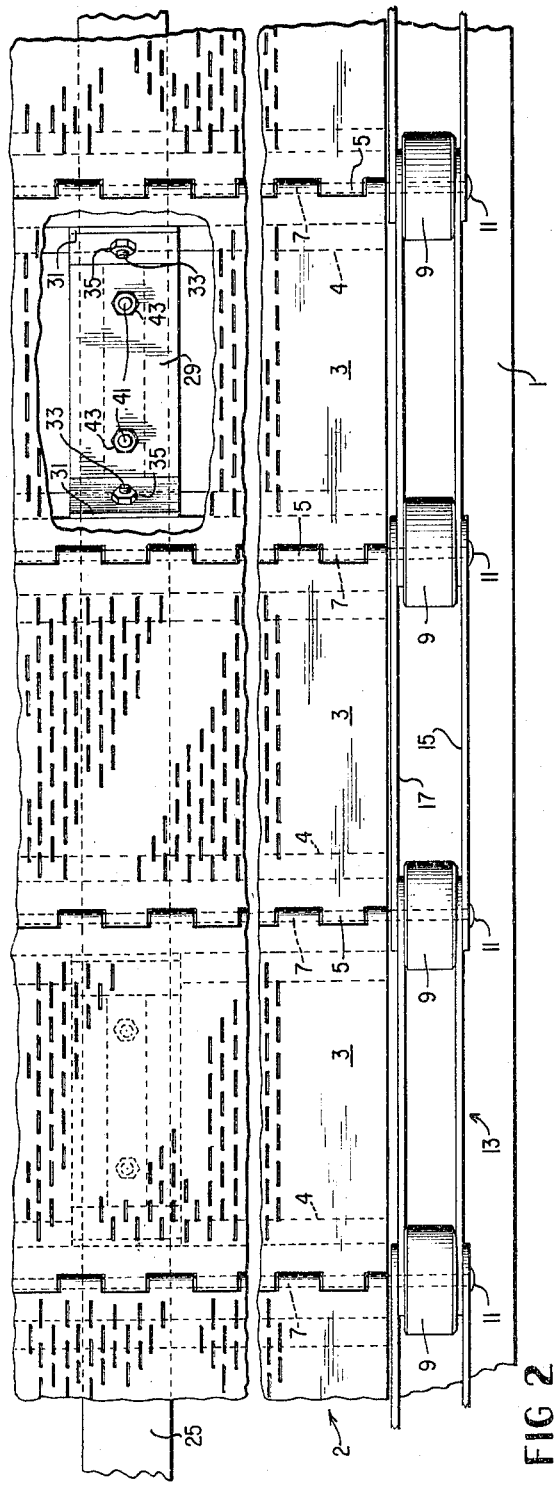
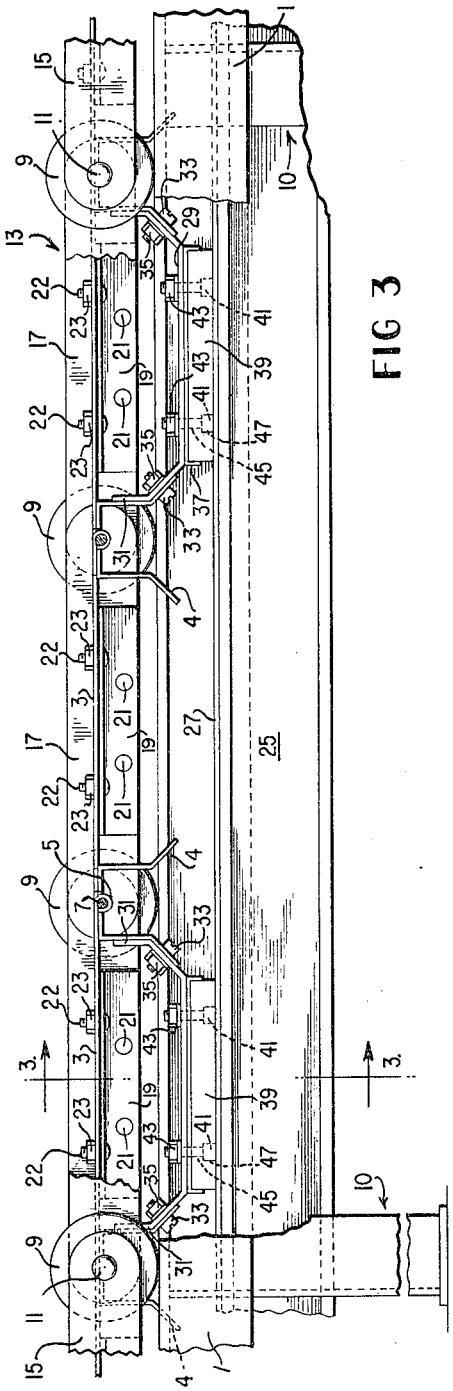
BY *Shanley & O'Neil*
ATTORNEYS.

United States Patent Office 3,194,388
Patented July 13, 1965

3,194,388
ENDLESS CONVEYOR WITH SUPPORT
Henry L. Wulff, Baton Rouge, La., assignor to Copolymer Rubber and Chemical Corporation, a corporation of Louisiana
Filed May 8, 1961, Ser. No. 108,471
8 Claims. (Cl. 198—195)

This invention relates to improvements in conveyor apparatus and more particularly to preventing sagging in the central portion of a conveyor belt.

A well-known type of conveyor apparatus comprises a movable conveyor belt and means for supporting the sides of the belt when the belt is stationary and when it is moving. In a typical apparatus of this type the conveyor belt comprises a series of flights hinged together and provided with a plurality of rollers rotatably mounted on either side of the conveyor belt adapted to roll on a pair of horizontal supporting members or rails. A series of chain links are generally provided which pass around sprockets at the ends of the conveyor apparatus and the conveyor flights are mounted on the chain links by suitable means such as riveting, bolting, etc. One of the sprockets is connected to a suitable driving mechanism including a prime mover such as a motor whereby the flights move with movement of the rollers along the horizontal supporting members or rails from one end of the conveyor apparatus to the other. The material to be conveyed is deposited on the flights at the entry end of the conveyor and moved with movement of the flights to the discharge end. At the discharge end of the conveyor the conveyor flights move downwardly and are emptied as the corresponding links of the chain pass around the sprocket. The flights return by horizontal movement beneath the material supporting surface of the conveyor to the entry end of the conveyor. The flights then move upward to form part of the material supporting surface as the corresponding chain links pass around the sprocket at the entry end of the conveyor.

Such prior art conveyor devices have certain inherent disadvantages due to the tendency for the conveyor belt to sag in the central portion. This results in unnecessary wear on the drive mechanism which drives the chain, on the chain itself and on the horizontal supporting members or rails and produces fatigue failures in the connection between the conveyor flights and the chain links. As a consequence the conveyor must be repaired often with resulting high maintenance costs and production losses.

Attempts have been made in the prior art to prevent sag by providing transverse stiffeners on the side of the conveyor belt or flights opposite that which supports the conveyed material. However, such stiffeners do not completely eliminate sag produced by a heavy load and thus problems of excessive wear on the drive chain and side rails and breakage of the conveyor flights at the point of attachment to the drive chain are still present.

Accordingly, it is the purpose of this invention to provide a simple and economical means of preventing sagging at the center of a conveyor belt and thereby substantially reduce unnecessary wear on the drive, chain and side rails and breakage of the conveyor flights at the points of attachment to the chain.

The purchase of this invention and advantages will become more readily apparent from the following detailed description, taken in connection with the accompanying drawings, wherein:

FIGURE 2 is a fragmentary plan view with parts removed for purposes of clarity of a conveyor apparatus embodying the principles of this invention;

FIGURE 3 is a fragmentary side elevational view with parts removed for purposes of clarity of the conveyor apparatus shown in FIGURE 1;

Figure 4:
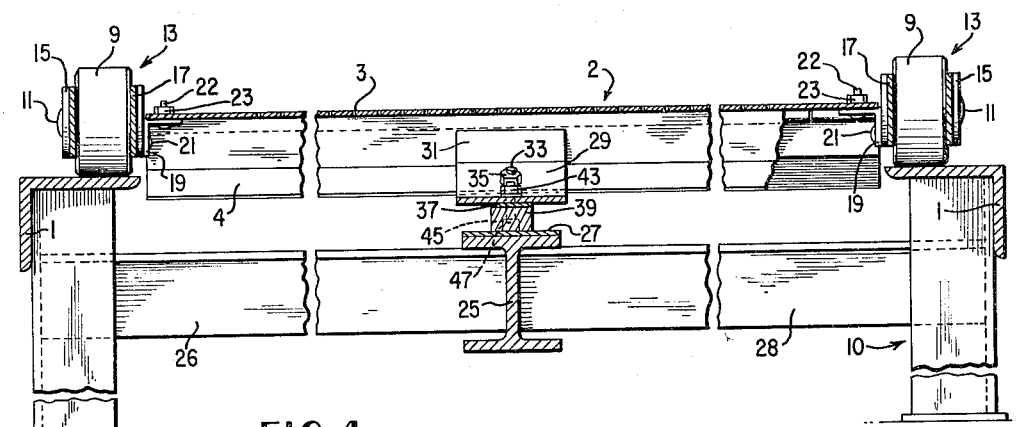
FIGURE 4 is a cross sectional view with parts removed for purposes of clarity of the conveyor apparatus taken along the line 3—3 of FIGURE 2.
Figure 5:
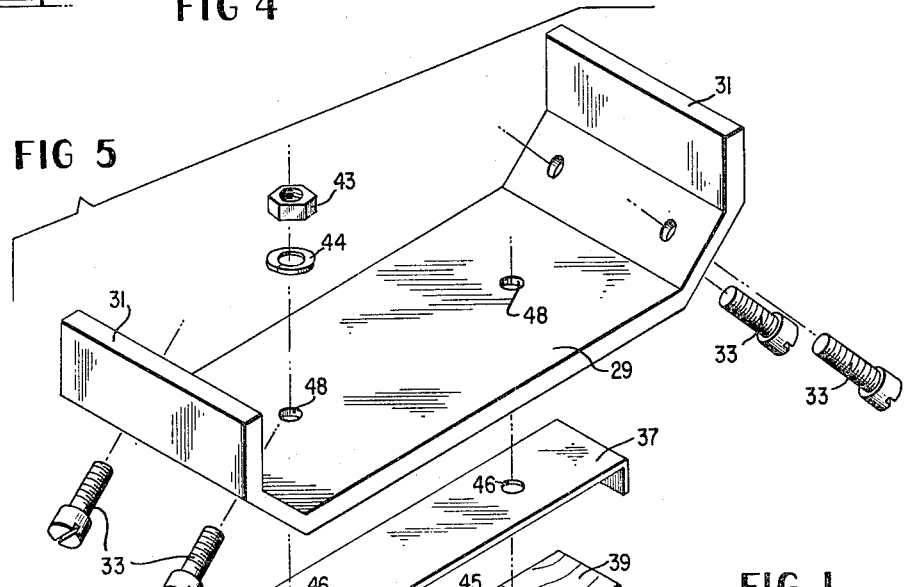
FIGURE 5 is an exploded three-dimensional view of a shoe member embodying the principles of this invention and the supporting means therefor.
Figure 1:
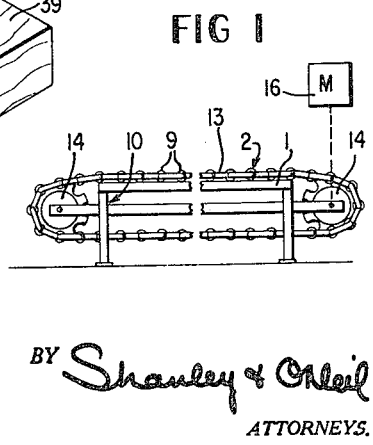
FIGURE 1 is a diagrammatic representation of a conveyor apparatus embodying the principles of this invention.

Referring to the drawings, the apparatus includes a suitable framework generally indicated at 10, a pair of horizontal members or rails 1, which may take the form of angle irons mounted on frame 10 and extending from the feed or entry end of the conveyor to the discharge end and a conveyor belt generally indicated at 2 provided with rollers 9 adapted to roll on the upper surfaces of rails 1. Conveyor belt 2 comprises a series of conveyor flights 3, fabricated from a suitable material such as steel, hinged together by hinges 5 including hinge pins 7 to provide a continuous movable conveying surface. The flights 3 are provided with integral transverse stiffeners 4 on the side of flights 3 opposite that which supports the conveyed material. The flights 3 are supported by the rollers 9 rotatably mounted on the extended ends of hinge pins 7, and chains, generally indicated at 13, provided on either side of the conveyor. Chains 13 are of the endless type which pass around sprockets 14 one of which is driven by a motor 16.

Chains 13 comprise a series of plates 15 and 17 pivotally connected together by pins 7. The rollers 9 and chains 13 are maintained on the pins 7 by suitable means such as heads 11. The conveyor flights 3 are affixed to the inner plates 17 by means of angle members 19 which are affixed to the flights 3 and the chain plates 17 by suitable means such as rivets 21, bolts 22 and nuts 23. The above conveyor structure is conventional, well-known to those skilled in the art and accordingly need not be described in further detail.

In accordance with this invention, an elongated supporting member such as a beam 25, of a suitable material such as steel, is provided which extends for substantially the length of the conveyor, i.e. from one sprocket to the other, and is disposed below the central portion of the conveyor. Beam 25 may be supported by any suitable means such as steel members 26 and 28 affixed to beam 25 and the conveyor frame 10 by suitable means such as welding. A wear plate 27 of a suitable material, such as carbon steel or stainless steel which withstands abrasion and has a smooth surface is mounted on the upper surface of the beam 25. In an example of an apparatus embodying the principles of this invention, the wear plate 27 was polished with a very fine emery cloth and coated with a silicone lubricant. Further lubrication was not necessary. A plurality of U-shaped supporting frames 29, fabricated from a suitable material such as steel, are mounted on the side of the conveyor belt 2 opposite that which supports the conveyed material in the central portion thereof with each leg 31 of the frame 29 affixed to a stiffener 4 by suitable means such as bolts 33 and nuts 35. A bracket 37 fabricated from a suitable material such as steel is mounted on each frame 29 and a shoe member 39, generally in the form of a rectangular block is mounted on each bracket 37 and frame 29 by means of bolts 41 passing through openings 45, 46 and 48 in shoe member 39, bracket 37 and frame 29, respectively, and nuts 43. A suitable lock washer 44 may be provided between nuts 43 and frame 29. The shoe member 39 is adapted to slidably engage the upper surface of the wear plate 27 and to support the central portion of the conveyor on the beam 25. Recesses 47 are provided in shoe members 39 around openings 45 to permit the shoe members to slide freely on the wear plate 27 without interference or scratching by the heads of bolts 41. Shoe members 39 are fabricated from a suitable self-lubricating material such as a tetrafluoroethylene polymer plastic to permit sliding movement along the upper surface of the wear plate 27 as the conveyor moves. While in the drawings a shoe member 39 is provided for every other conveyor flight 3, for some applications it may be necessary to provide a shoe member for every conveyor flight while in other applications a shoe member for every third or fourth conveyor flight may be all that is required.

The conveyor apparatus as above described operates in the usual manner. More specifically, one of the sprockets 14 is driven by motor 16 thereby causing the chain 13 and flights 3 attached thereto to travel along a longitudinal path from one end of the conveyor to the other with the rollers 9 rolling along the upper surface of rails 1. The material to be conveyed is deposited on the upper flights 3 at the entry end of the conveyor apparatus and travels with travel of the flights to the discharge end. At the discharge end of the conveyor the flights 3 move downwardly and are emptied as the corresponding links of the chain 13 pass around the sprocket 14. The flights 3 and corresponding links of chain 13 then travel along the lower part of the conveyor apparatus to the entry end where the chain and flights move upward around the sprocket 14 to the material receiving position.

Sagging of the portions of the loaded conveyor flights 3 suspended from chains 13 and rollers 19 is substantially reduced by the shoe members 39 mounted on brackets 37 and frames 29 which in turn are affixed to stiffeners 4 of flights 3. Shoe members 39 slide along the upper surface of wear plate 27 as the conveyor flights 3 travel along the longitudinal path from the entry end to the exit end of the conveyor apparatus and thus support the suspended portions of the conveyor belt 2. This eliminates or substantially reduces sagging of the loaded conveyor flights thereby greatly reducing down time and repairs resulting from wear on the drive mechanism, chain 13 and rails 1, and reducing fatigue failures in the connection between the conveyor flights 3 and the chain 13.

It is to be understood that various changes and modifications may be made to the foregoing without departing from the spirit of the invention or the scope of the appended claims.

What is claimed is:

1. A conveyor belt having horizontal upper and lower runs and comprising an endless series of sections articulately interconnected about parallel horizontal axes that are spaced apart lengthwise of the belt with each of the sections disposed between a pair of adjacent axes, each of a plurality of the sections having a material supporting portion and a pair of brackets that depend downwardly when the associated section is in the upper run of the conveyor, one bracket being disposed adjacent each of the axes which are at either end of the section, and a U-shaped supporting frame carried by the downwardly depending pair of brackets, the supporting frame extending between the brackets and being disposed between the side edges of the conveyor belt and beneath the material supporting portion of the associated section when it is in the upper run of the conveyor, the U-shaped supporting frame being arranged in a generally upright manner with the legs extending upward from the portion thereof intermediate the legs, the legs being attached to the downwardly depending pair of brackets and the said portion intermediate the legs being spaced below the material supporting portion of the associated conveyor section when it is the upper run of the conveyor, and a supporting shoe carried by the supporting frame, the shoe being disposed between the side edges of the conveyor belt and beneath the said portion intermediate the legs of the supporting frame when the associated conveyor section is in the upper run of the conveyor.

2. A conveyor belt as claimed in claim 1, the shoes being disposed midway of the width of the belt.

3. A conveyor belt as claimed in claim 1, the shoe being disposed below the plane of said axes at either end of the section.

4. A conveyor belt as claimed in claim 1, the belt being supported at its edges by rollers coaxial with said axes and the supporting shoe being disposed approximately midway of the width of the conveyor belt.

5. A conveyor belt as claimed in claim 1, the belt being supported at its edges by rollers coaxial with said axes, said shoe being disposed lower than said rollers when the rollers are in the upper run of the conveyor.

6. A conveyor belt as claimed in claim 1, wherein means is provided for releasably interconnecting the legs of the supporting frame and the brackets, and means is provided for releasably interconnecting the supporting shoe and the said portion of the frame intermediate the legs.

7. A conveyor belt as claimed in claim 6, wherein each of the said interconnecting means is accessible from below the interconnected portions whereby the interconnecting means may be readily released.

8. A conveyor belt as claimed in claim 1 wherein the said brackets are formed by folding end portions of the sections adjacent each of the axes downwardly to thereby form integral transverse stiffeners.

References Cited by the Examiner

UNITED STATES PATENTS

| | | | |
|---|---|---|---|
| 812,374 | 2/06 | Smead | 198—195 |
| 874,915 | 12/07 | Perry | 198—195 |
| 1,586,382 | 5/26 | Reed | 198—195 |
| 1,641,515 | 9/27 | Williams | 198—195 |
| 1,883,528 | 10/32 | Buck | 198—195 |
| 2,778,479 | 1/57 | Meyer | 198—195 |
| 2,969,870 | 1/61 | Pulver | 198—195 |
| 3,082,861 | 3/63 | Kornylak | 198—195 |
| 3,123,202 | 3/64 | Stevens | 198—196 |

SAMUEL F. COLEMAN, *Primary Examiner.*

WILLIAM B. LA BORDE, *Examiner.*